(12) United States Patent
Iwashita et al.

(10) Patent No.: US 7,170,256 B2
(45) Date of Patent: Jan. 30, 2007

(54) MOTOR CONTROL DEVICE

(75) Inventors: Yasusuke Iwashita, Fujiyoshida (JP); Tadashi Okita, Fujiyoshida (JP); Hiroshi Kougami, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 0 days.

(21) Appl. No.: 11/167,254

(22) Filed: Jun. 28, 2005

(65) Prior Publication Data

US 2006/0012327 A1 Jan. 19, 2006

(30) Foreign Application Priority Data

Jun. 30, 2004 (JP) ............................. 2004-194222

(51) Int. Cl.
*H02P 1/54* (2006.01)
*H02K 21/00* (2006.01)

(52) U.S. Cl. ..................... 318/717; 318/700; 318/708; 318/713; 318/714; 318/715; 318/138; 318/439

(58) Field of Classification Search ................ 318/138, 318/254, 439, 700–800
See application file for complete search history.

(56) References Cited

U.S. PATENT DOCUMENTS

| | | | | |
|---|---|---|---|---|
| 4,455,520 A | * | 6/1984 | Ward et al. ................. | 318/696 |
| 4,570,214 A | * | 2/1986 | Tanaka ........................ | 363/160 |
| 5,569,995 A | * | 10/1996 | Kusaka et al. ............... | 318/717 |
| 6,239,781 B1 | * | 5/2001 | Fujisawa ..................... | 345/691 |
| 6,326,748 B1 | * | 12/2001 | Moroto et al. ............... | 318/254 |
| 6,377,017 B2 | * | 4/2002 | Kondou et al. .............. | 318/727 |
| 6,512,341 B2 | * | 1/2003 | Matsushiro et al. ......... | 318/254 |
| 6,762,581 B2 | * | 7/2004 | Karikomi ..................... | 318/800 |

FOREIGN PATENT DOCUMENTS

| JP | 2003-52199 | | 2/2003 |
|---|---|---|---|
| JP | 2006-20397 | * | 1/2006 |

* cited by examiner

*Primary Examiner*—Lincoln Donovan
*Assistant Examiner*—Tyrone Smith
(74) *Attorney, Agent, or Firm*—Drinker Biddle & Reath LLP (57) ABSTRACT

In the control of a synchronous motor having a permanent magnet, an alternating current power supply voltage that is input to a power amplifier or a direct current link voltage of which input voltage is rectified is measured. A reactive current (a d-axis current) or a current control phase advance is changed, according to this power supply voltage. With this arrangement, reactive current control or current phase control can be carried out directly according to a change in the input power supply voltage. A motor control device includes a voltage measuring unit that measures a voltage supplied to a driving amplifier, and a current control unit that controls a current passed to a synchronous motor based on the measured voltage. The voltage measuring unit measures a voltage supplied to the amplifier. The current control unit controls a current that is passed to the synchronous motor, according to the measured voltage. As a result, the motor control device can directly control the current according to a change in the input power supply voltage to the motor.

19 Claims, 12 Drawing Sheets

MOTOR CONTROL DEVICE

BACKGROUND OF THE INVENTION

1. Field of the Invention

The present invention relates to a motor control device and, more particularly, to control of a synchronous motor according to a DQ transformation.

2. Description of the Related Art

There is known a method of DQ transforming three-phase currents into two phase currents of a d-phase and a q-phase, and then controlling each phase. In a control method of controlling a synchronous motor based on orthogonal DQ coordinate axes, a change in a maximum output voltage of a motor control device due to a change in a power supply voltage is assumed. In this case, parameters having a voltage margin are conventionally set so as to be able to stably drive a synchronous motor. A reactive current or a current control phase is set so that the torque becomes the largest in the lowest conceivable input voltage state.

Figure 10:
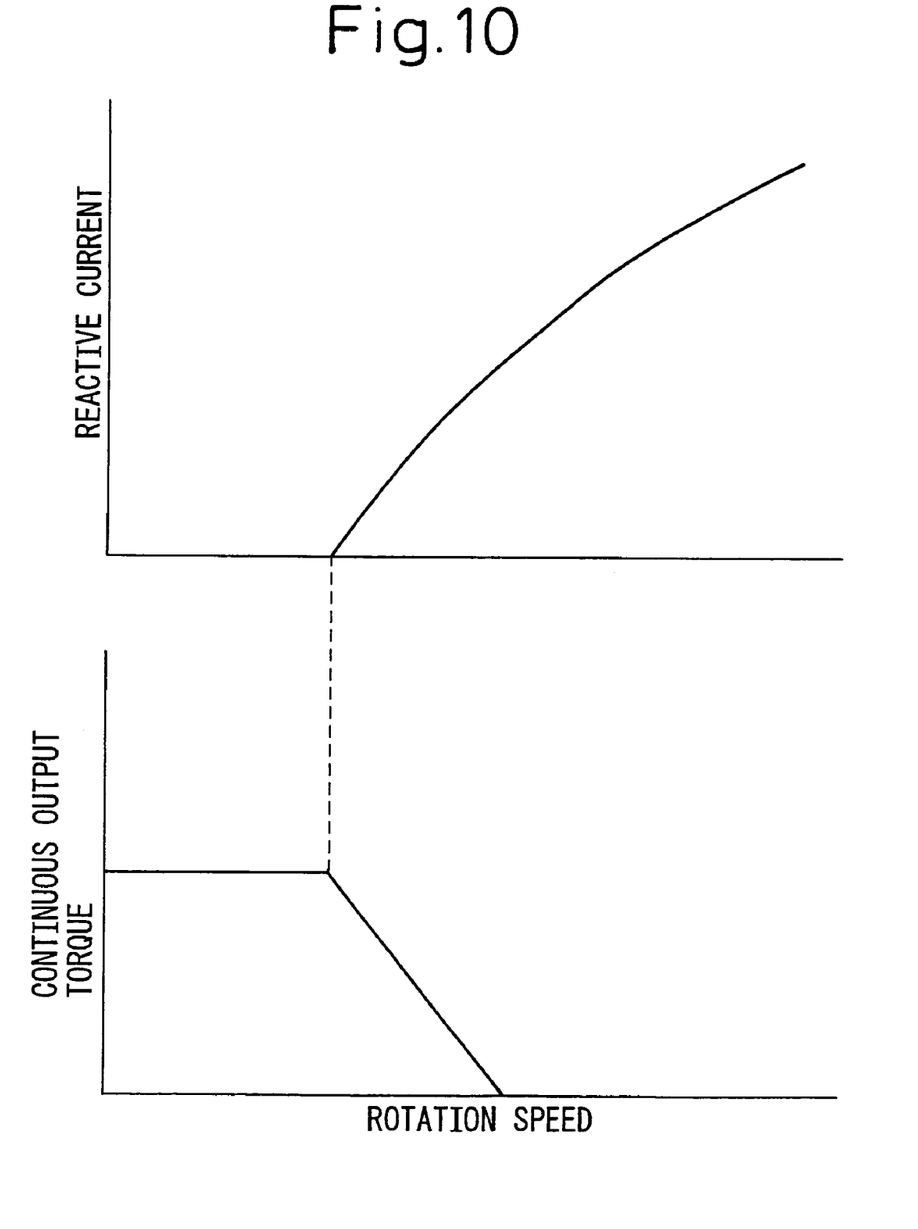
FIG. 10 is a characteristic diagram showing a relationship between a reactive current and a rotation speed and a relationship between a continuous output torque and a rotation speed, according to a conventional reactive current control.

FIG. 10 is a characteristic diagram showing a relationship between a reactive current and a rotation speed and a relationship between a continuous output torque and a rotation speed, according to a conventional reactive current control. According to the conventional reactive current control, a reactive current that is required for rotation at the assumed minimum voltage must be supplied. A continuous output torque decreases rapidly in a high-speed area.

Figure 11:
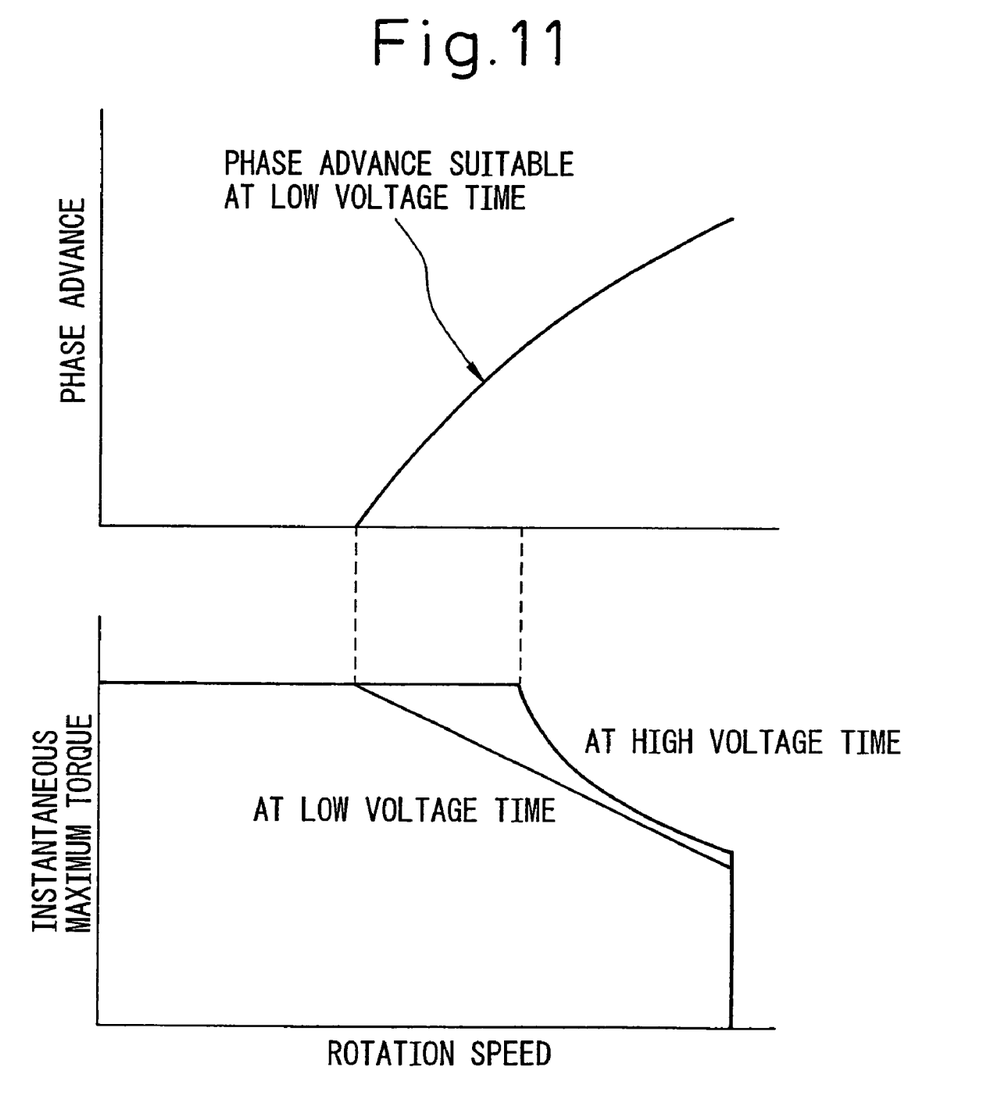
FIG. 11 is a characteristic diagram showing a relationship between the phase advance and instantaneous maximum torque, and a rotation speed, according to conventional phase advancement.
Figure 12:
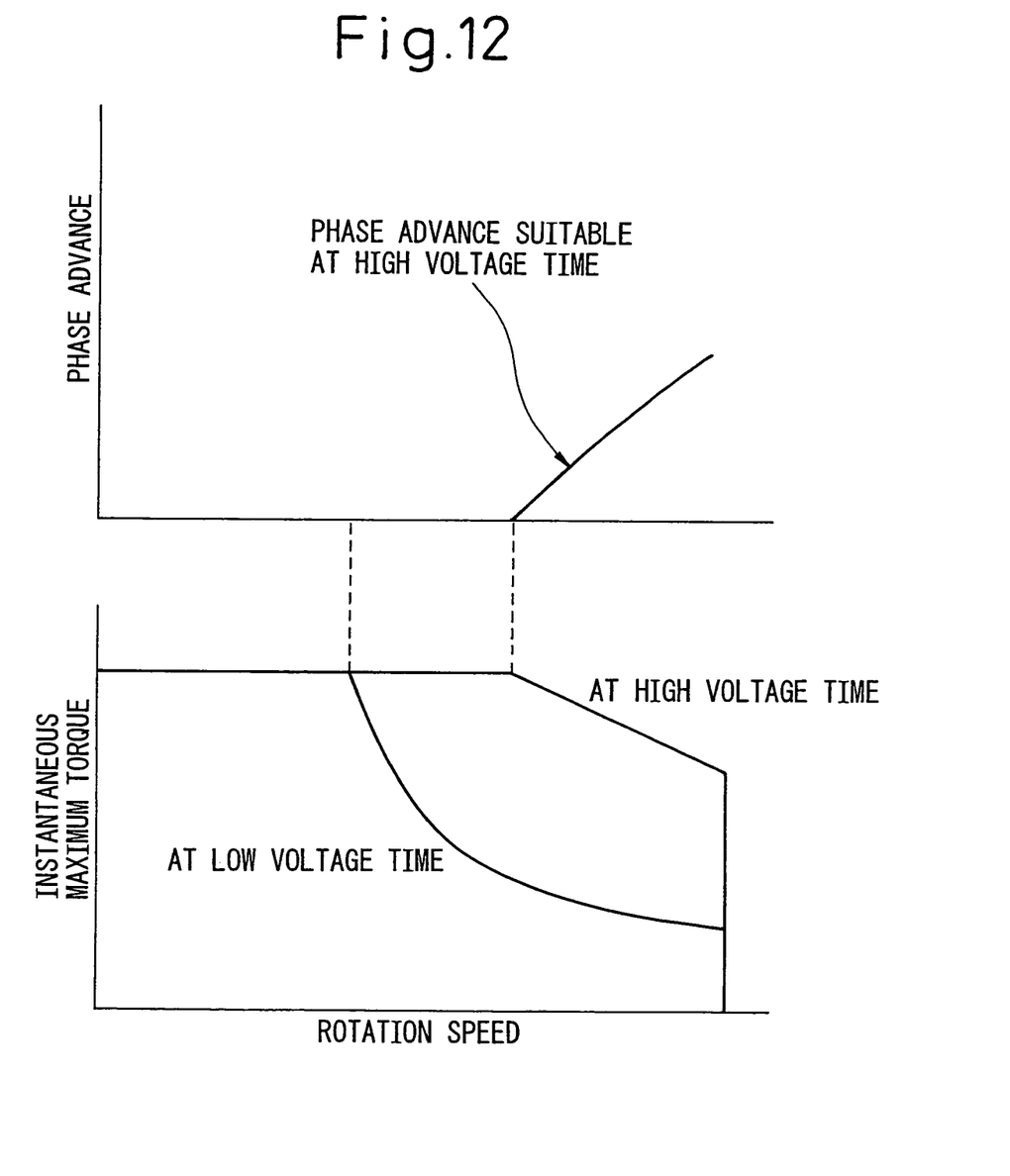
FIG. 12 is a characteristic diagram showing a relationship between the phase advance and instantaneous maximum torque, and a rotation speed, according to conventional phase advancement.

FIG. 11 and FIG. 12 are characteristic diagrams showing a relationship between the phase advance and a rotation speed and a relationship between instantaneous maximum torque and a rotation speed, according to conventional phase advancement. FIG. 11 shows an example of a phase advance control that is suitable when the voltage is low. The phase advance is controlled constantly regardless of voltage. Therefore, the torque decreases when the voltage is high. On the other hand, FIG. 12 shows an example of a phase advance control that is suitable when a voltage is high. Because the phase advance is controlled constantly regardless of the voltage, the torque decreases when the voltage is low.

When a power supply voltage changes, a maximum voltage that a motor control device can apply to a motor changes due to this change in the power supply voltage. Therefore, when a current command is generated based on parameters that is set when the power supply voltage is maximum, the voltage becomes short when the power supply voltage decreases to a minimum value, and the current control becomes unstable. In this state, a voltage command value inside a controller becomes large due to a reduction in the power supply voltage in order to maintain a terminal voltage of the motor that rotates at the same commanded rotation speed. By utilizing this characteristic, a motor control device is proposed as disclosed in Japanese Patent Application Unexamined Publication No. 2003-52199. This motor control device changes a base speed (starting speed) at which a d-phase current is started to be passed based on voltage command values that are output as functions of d-phase and q-phase current command values in a high-speed rotation area. Based on this, a maximum current in the d-phase and a minimum current in the d-phase are adjusted to indirectly adjust a d-phase current command value, thereby decreasing the influence of a variation in the power supply voltage.

In the case of setting a reactive current or a current control phase so that the torque becomes the largest in a conceivable minimum voltage state due to a variation in the power supply voltage, a d-phase current of more than necessary is supplied because a voltage margin of the motor control device is taken into account. As a result, the motor output efficiency relative to current becomes low, and motor heating increases.

The motor control device described in Japanese Patent Application Unexamined Publication No. 2003-52199 uses characteristics of the inside of the controller to change a base rotation speed at which a d-phase current is started to be passed based on voltage commands that are output as functions of the d-phase and q-phase current commands in the high-speed rotation area. With this arrangement, the motor control device indirectly changes the d-phase current command to decrease the influence of variation in the power supply voltage. This motor control device does not directly control the reactive current or directly control the current phase according to a change in the input power supply voltage.

SUMMARY OF THE INVENTION

It is an object of the present invention to provide a motor control device that directly controls a reactive current or directly controls a current phase according to a change in the input power supply voltage.

According to the present invention, in the control of a synchronous motor having a permanent magnet, an alternating current power supply voltage that is input to a power amplifier or a direct current link voltage of which input voltage is rectified is measured. A reactive current (a d-axis current) or the current control phase advance is changed, according to this power supply voltage. With this arrangement, reactive current control or current phase control can be carried out directly according to a change in the input power supply voltage.

According to the present invention, in the control of a synchronous motor having a permanent magnet, a motor control device includes a voltage measuring unit that measures a voltage supplied to a driving amplifier, and a current control unit that controls a current passed to a synchronous motor based on the measured voltage. The voltage measuring unit measures a voltage supplied to the driving amplifier. The current control unit controls a current that is passed to the synchronous motor, according to the measured voltage. As a result, the motor control device can directly control the current according to a change in the input power supply voltage of the driving amplifier.

The present invention has a first aspect of controlling a reactive current and a second aspect of controlling a current phase.

In the first aspect of controlling a reactive current according to the present invention, a motor control device includes a voltage measuring unit that measures a voltage supplied to a driving amplifier, and a reactive current adjusting unit that adjusts a reactive current passed to a synchronous motor based on the measured voltage.

A voltage measurement can take plural patterns.

A first pattern is to measure an alternating current voltage. The voltage measuring unit measures an alternating current power supply voltage that is supplied to a driving amplifier. The reactive current adjusting unit adjusts a reactive current that is passed to the synchronous motor based on the measured alternating current power supply voltage.

A second pattern is to measure a direct current voltage. The voltage measuring unit measures a direct current link voltage supplied to the driving amplifier, or a direct current link voltage converted from an alternating current power supply input within the driving amplifier. The reactive current adjusting unit adjusts a reactive current that is passed to the synchronous motor based on the measured direct current link voltage.

In each of the above patterns, the reactive current adjusting unit can take plural modes.

The reactive current adjusting unit according to a first mode includes a speed difference calculating unit that calculates a speed difference between a motor actual speed and a base speed at which a reactive current is started to be passed, and a base speed changing unit that changes the base speed based on a measured voltage, thereby generating a reactive current command based on the speed difference. The reactive current adjusting unit generates a reactive current command by multiplying a speed dependence coefficient of the reactive current to the calculated speed difference. The motor control device includes a speed dependence coefficient adjusting unit that adjusts a speed dependence coefficient of a reactive current based on a measured voltage.

The reactive current adjusting unit according to a second aspect includes a reactive current maximum value changing unit that changes a maximum value of a reactive current based on a measured voltage, thereby limiting a maximum value of a reactive current command based on the changed maximum value of the reactive current. The reactive current maximum value changing unit generates a reactive current command as a changed value by multiplying a voltage dependence coefficient to a voltage difference between a measured voltage and a reference voltage.

In the second aspect of controlling a current phase according to the present invention, in the control of a synchronous motor having a permanent magnet, a motor control device includes a voltage measuring unit that measures a voltage supplied to a driving amplifier, and a phase advance adjusting unit that adjusts the phase advance from a reference phase of a current that is passed to the synchronous motor.

A voltage measurement can take plural patterns, as in the first aspect of controlling a reactive current.

A first pattern is to measure an alternating current voltage. The voltage measuring unit measures an alternating current power supply voltage that is supplied to a driving amplifier. The phase advance adjusting unit adjusts the phase advance from a reference phase of a current that is passed to the synchronous motor based on a measured alternating current power supply voltage.

A second pattern is to measure a direct current voltage. The voltage measuring unit measures a direct current link voltage supplied to the driving amplifier, or a direct current link voltage converted from an alternating current power supply input within the driving amplifier. The phase advance adjusting unit adjusts the phase advance from a reference phase of a current that is passed to the synchronous motor based on a measured direct current link voltage.

In each of the above patterns, the phase advance adjusting unit can also take plural modes, as in the reactive current adjusting unit.

The phase advance adjusting unit according to a first mode includes a speed difference calculating unit that calculates a speed difference between a motor actual speed and a base speed at which a phase advance is started, and a base speed changing unit that changes the base speed based on a measured voltage, thereby generating the phase advance. The phase advance adjusting unit generates the phase advance by multiplying a speed dependence coefficient of the phase advance to the calculated speed difference. The motor control device includes a speed dependence coefficient adjusting unit that adjusts a speed dependence coefficient of the phase advance based on a measured voltage.

The phase advance adjusting unit according to a second mode includes a phase advance maximum value changing unit that changes a maximum value of a phase advance based on a measured voltage, thereby limiting a maximum value of a phase advance based on the changed maximum value of the phase advance. The phase advance maximum value changing unit generates a phase advance maximum value as a changed value by multiplying a voltage dependence coefficient of the phase advance maximum value to a voltage difference between a measured voltage and a reference voltage.

Terms used in claims are not limited to the specific meanings described in the embodiments.

BRIEF DESCRIPTION OF THE DRAWINGS

The present invention will be more clearly understood from the description as set below with reference to the accompanying drawings, wherein.

DETAILED DESCRIPTION

Embodiments of the present invention are explained in detail below with reference to the drawings.

Figure 1:
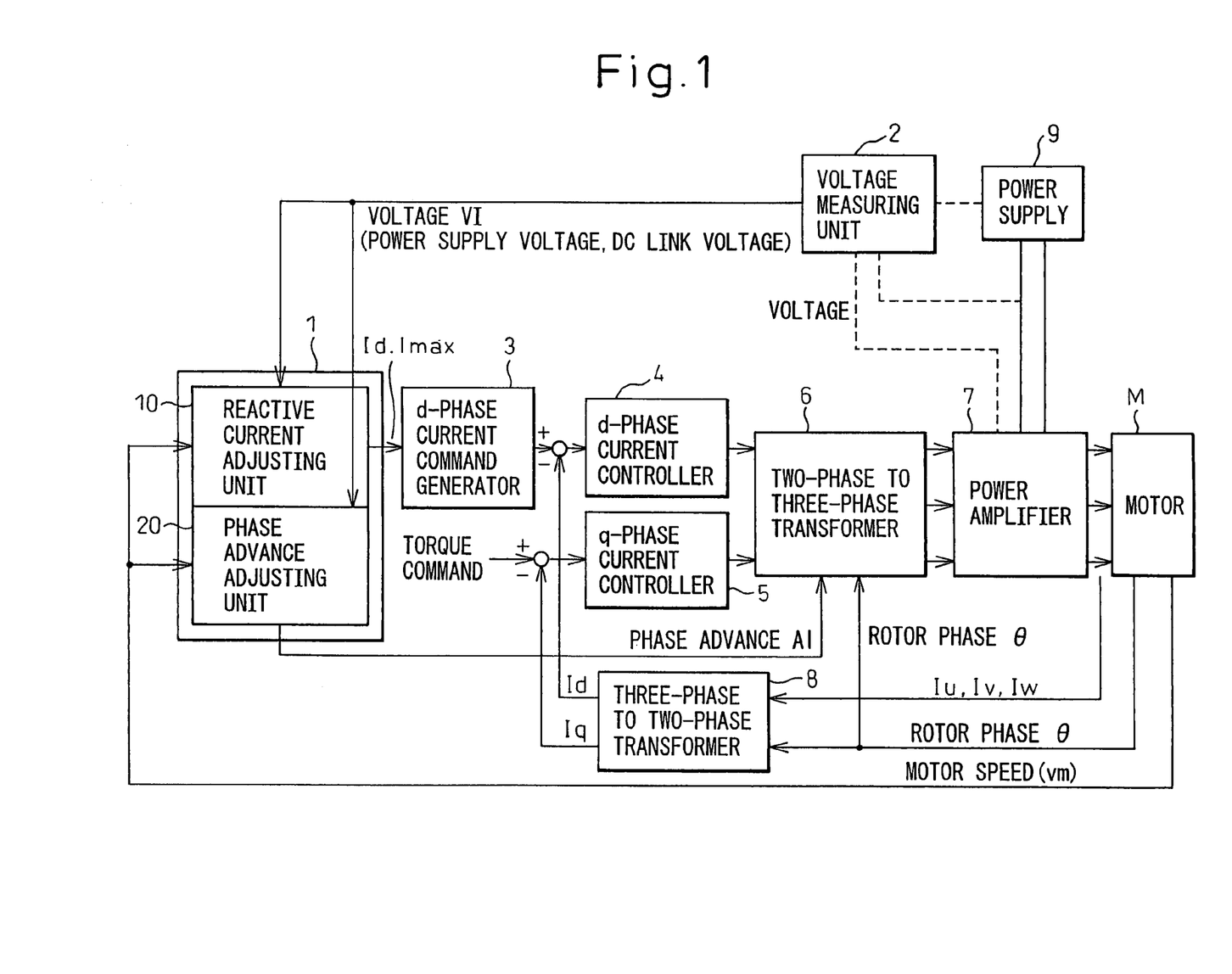
FIG. 1 is a block diagram for explaining a configuration of a motor control device according to the present invention.

FIG. 1 is a block diagram for explaining a configuration of a motor control device according to the present invention.

In a synchronous motor having a permanent magnet, a speed control is carried out as follows. Usually, a torque command (a current command) is obtained by feedback controlling a speed based on a speed command and a speed feedback signal. A current command in each phase is obtained by matching the torque command and a detected rotor phase. A current loop is controlled based on the current command in each phase and an actual current value in each phase. A current passed to the winding in each phase is controlled, and the motor is drived, thereby controlling the speed.

In the DQ transformation control, a DQ transformation is carried out to obtain a current value of a d-phase reactive current component and a q-phase actual current component from three-phase current values, based on a current value in each phase detected by a current detector and a detected rotor phase. The obtained d-phase and q-phase current values are used as current feedback values. A torque command value output from the speed loop is used as a q-phase current command value, and a d-phase current command value is set "0". Feedback control such as integral and proportional control are carried out based on the d-phase and q-phase current command values and the current feedback values, thereby obtaining the d-phase and q-phase voltage command values. Further, a DQ transformation is carried out to transform the d-phase and q-phase voltage command values to three-phase voltage command values for driving the motor, thereby obtaining the three-phase voltage command values. Based on the obtained three-phase voltage command values, a power amplifier such as an inverter is drived to drive the motor.

In FIG. 1, a reference number 3 denotes a d-phase current command generator, and a reference number 4 denotes a d-phase current controller that obtains a d-phase voltage command based on a difference between a d-phase current command generated by the d-phase current command generator and a d-phase current value transformed by a three-phase to two-phase transformer 8. A reference number 5 denotes a q-phase current controller that obtains a q-phase voltage command based on a difference between a torque command and a q-phase current value transformed by the three-phase to two-phase transformer 8. A reference number 6 denotes a two-phase to three-phase transformer that transforms the d-phase and q-phase command voltages to three-phase command voltages for driving the motor by DQ transformation. A reference number 7 denotes a power amplifier such as an inverter that passes currents Iu, Iv, and Iw to the phases of a motor M based on the obtained three-phase command voltages. The reference number 8 denotes the three-phase to two-phase transformer that transforms three-phase currents to two-phase currents Id and Iq based on the actual three-phase currents Iu, Iv, and Iw and a rotor phase θ of the motor M.

The power amplifier 7 receives power from a power supply 9. The power supply 9 supplies an alternative current voltage or a direct current link voltage to the power amplifier 7.

The motor control device according to the present invention includes a voltage measuring unit 2 that measures a voltage supplied to the power amplifier 7, and a current control unit 1 that controls a current passed to the synchronous motor based on a voltage measured by the voltage measuring unit 2, in addition to the above configuration.

The voltage measuring unit 2 measures an alternating current power supply voltage supplied to the power amplifier 7, or a direct current link voltage supplied to the power amplifier 7, or a direct current link voltage converted from an alternating current power supply input within the power amplifier 7. The current control unit 1 adjusts the reactive current passed to the synchronous motor based on a measured alternating current power supply voltage or a measured direct current link voltage.

The current control unit 1 includes a reactive current adjusting unit 10 that adjusts a reactive current passed to the synchronous motor based on a measured voltage, and a phase advance adjusting unit 20 that adjusts a phase advance from a reference phase of a current passed to the synchronous motor based on a measured voltage. The current control unit 1 controls the d-phase current command generating unit 3 by adjusting the reactive current or the phase advance, thereby controlling the current passed to the synchronous motor.

Next, an example of a configuration of the reactive current adjusting unit 10 is explained with reference to FIGS. 2 and 3, and an example of a configuration of the phase advance adjusting unit 20 is explained with reference to FIGS. 4 and 5.

First, the configuration of the reactive current adjusting unit 10 is explained. The reactive current adjusting unit 10 can adjust a reactive current in the following two aspects.

Figure 2:
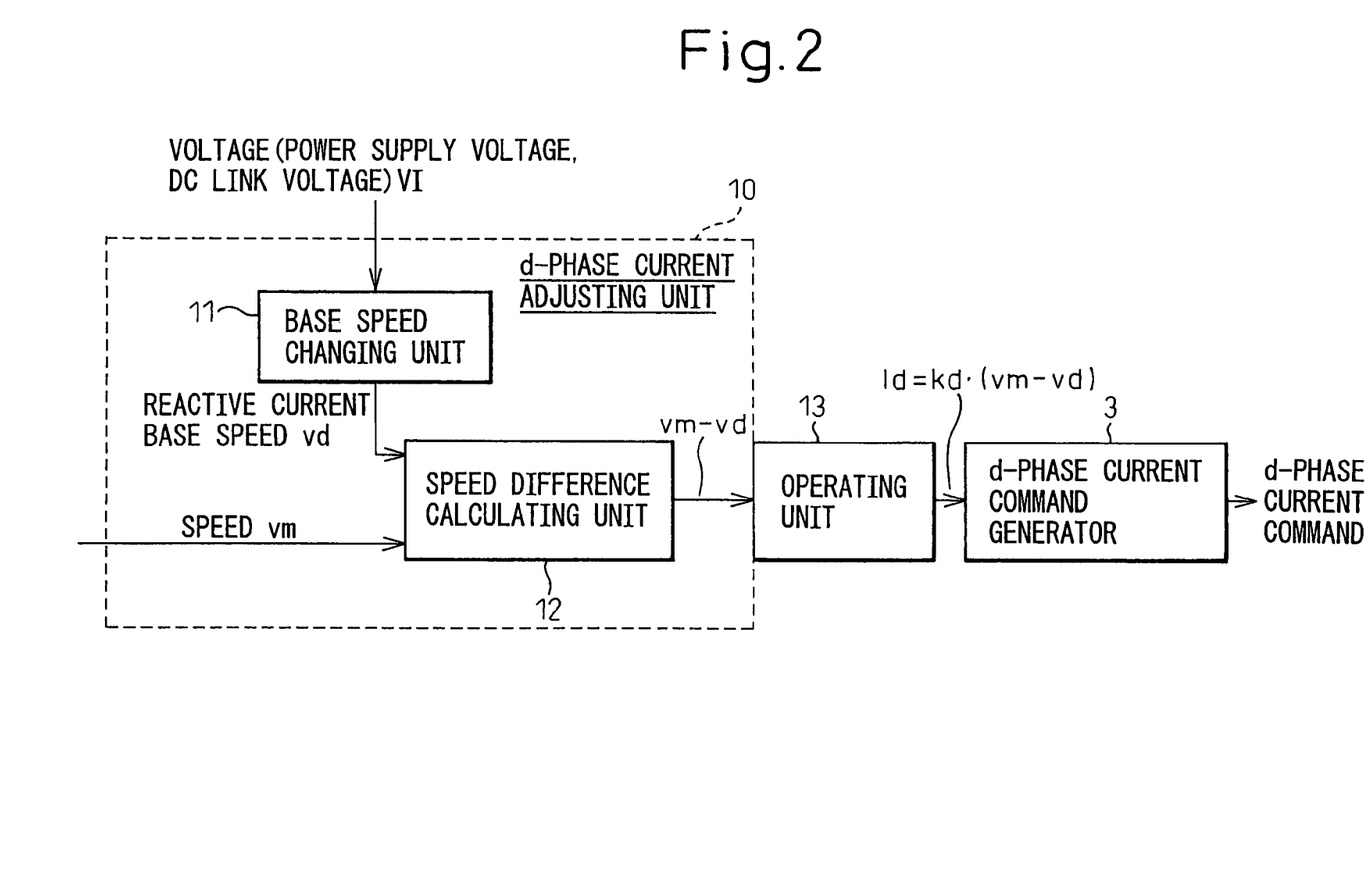
FIG. 2 is a block diagram for explaining a first aspect of a reactive current adjusting unit according to the present invention.

FIG. 2 is a block diagram for explaining a first aspect of a reactive current adjusting unit according to the present invention. In FIG. 2, the reactive current adjusting unit 10 according to the first aspect includes a base speed changing unit 11 that changes a base speed (vd) at which a reactive current is started to be passed based on a measured voltage VI, and a speed difference calculating unit 12 that calculates a speed difference (vm−vd) between a motor actual speed (vm) and the base speed (vd) at which a reactive current is started to be passed.

An operating unit 13 multiplies a speed dependence coefficient Kd of a d-axis current to the speed difference (vm−vd) calculated by the speed difference calculating unit 12, thereby generating a reactive current command, and transmits the reactive current command to the d-phase current command generator 3.

Figure 3:
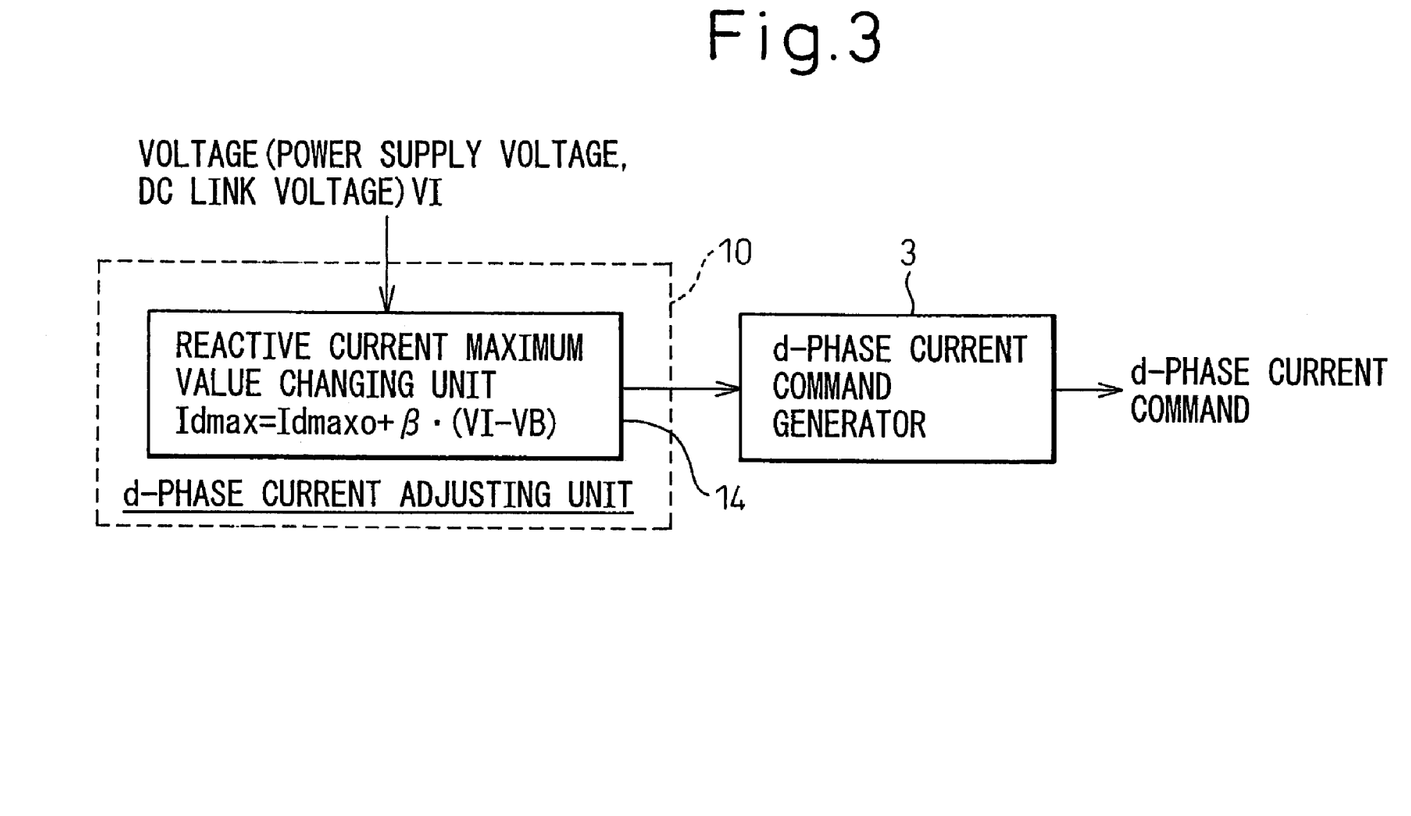
FIG. 3 is a block diagram for explaining a second aspect of a reactive current adjusting unit according to the present invention.

FIG. 3 is a block diagram for explaining a second aspect of a reactive current adjusting unit according to the present invention. In FIG. 3, the reactive current adjusting unit 10 according to the second aspect includes a reactive current maximum value changing unit 14 that changes a maximum value Idmax of a reactive current based on the measured voltage VI. The reactive current maximum value changing unit 14 multiplies a voltage dependence coefficient β of a reactive current maximum value to a voltage difference (VI−VB) between the measured voltage VI and a reference voltage VB, thereby obtaining a product (β·(VI−VB)). The reactive current maximum value changing unit 14 adds this value (β·(VI−VB)) to a reference value Idmax0 of a maximum value of a reactive current, thereby generating the reactive current maximum value Idmax, and transmits the reactive current maximum value Idmax to the d-phase current command generator 3.

When the d-phase current command generator 3 determines a d-phase current command, a torque command (a q-phase current) may be taken into account in some cases.

An example of a configuration of the phase advance adjusting unit 20 is explained next. The phase advance adjusting unit 20 can adjust a phase advance in two modes.

Figure 4:
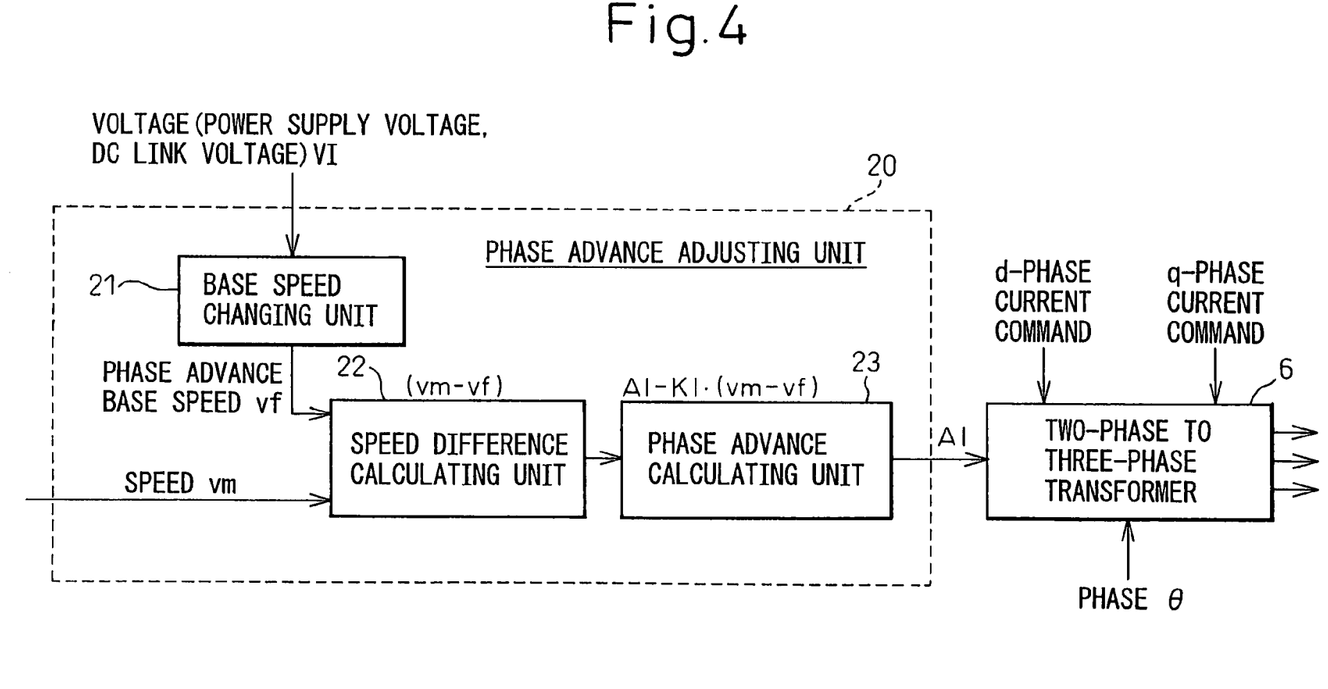
FIG. 4 is a block diagram for explaining a first aspect of a phase advance adjusting unit according to the present invention.

FIG. 4 is a block diagram for explaining a first aspect of a phase advance adjusting unit. In FIG. 4, the phase advance adjusting unit 20 according to a first aspect includes a base speed changing unit 21 that changes a base speed (vf) at which a phase advance is started based on the measured voltage VI, and a speed difference calculating unit 22 that calculates a speed difference (vm−vf) between a motor actual speed (vm) and the base speed (vf) at which a phase advance is started.

A phase advance calculating unit 23 multiplies a speed dependence coefficient KI of a phase advance to the speed difference (vm−vf) calculated by the speed difference calculating unit 22, thereby generating a phase advance (AI), and transmits the phase advance (AI) to a two-phase to three-phase transformer 6.

When the phase advance calculating unit 23 determines a phase advance, a torque command (a q-phase current) may be taken into account in some cases.

Figure 5:
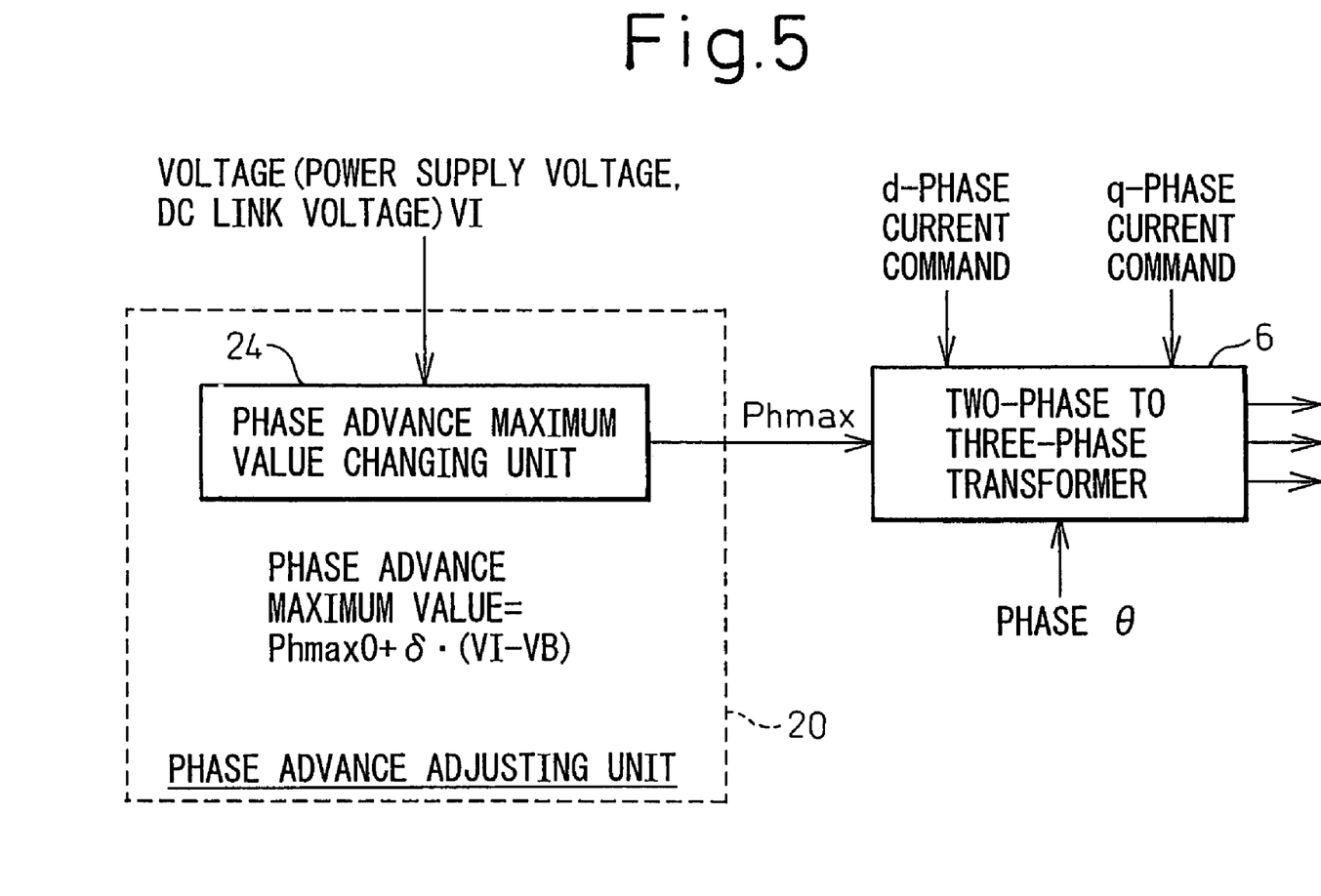
FIG. 5 is a block diagram for explaining a second aspect of a phase advance adjusting unit according to the present invention.

FIG. 5 is a block diagram for explaining a second aspect of a phase advance adjusting unit. In FIG. 5, the phase advance adjusting unit 20 according to a second aspect includes a phase advance maximum value changing unit 24 that changes a maximum value of a phase advance Phmax based on the measured voltage VI. The phase advance maximum value changing unit 24 multiplies a voltage dependence coefficient δ of a phase advance maximum value to the difference (VI−VB) between the measured voltage VI and the reference voltage VB, thereby obtaining a product (δ·(VI−VB)). The phase advance maximum value changing unit 24 adds this value (δ·(VI−VB)) to a reference value Phmax0 of a maximum value of a phase advance, thereby generating the phase advance maximum value Phmax, and transmits the phase advance maximum value Phmax to the two-phase to three-phase transformer 6.

Figure 6:
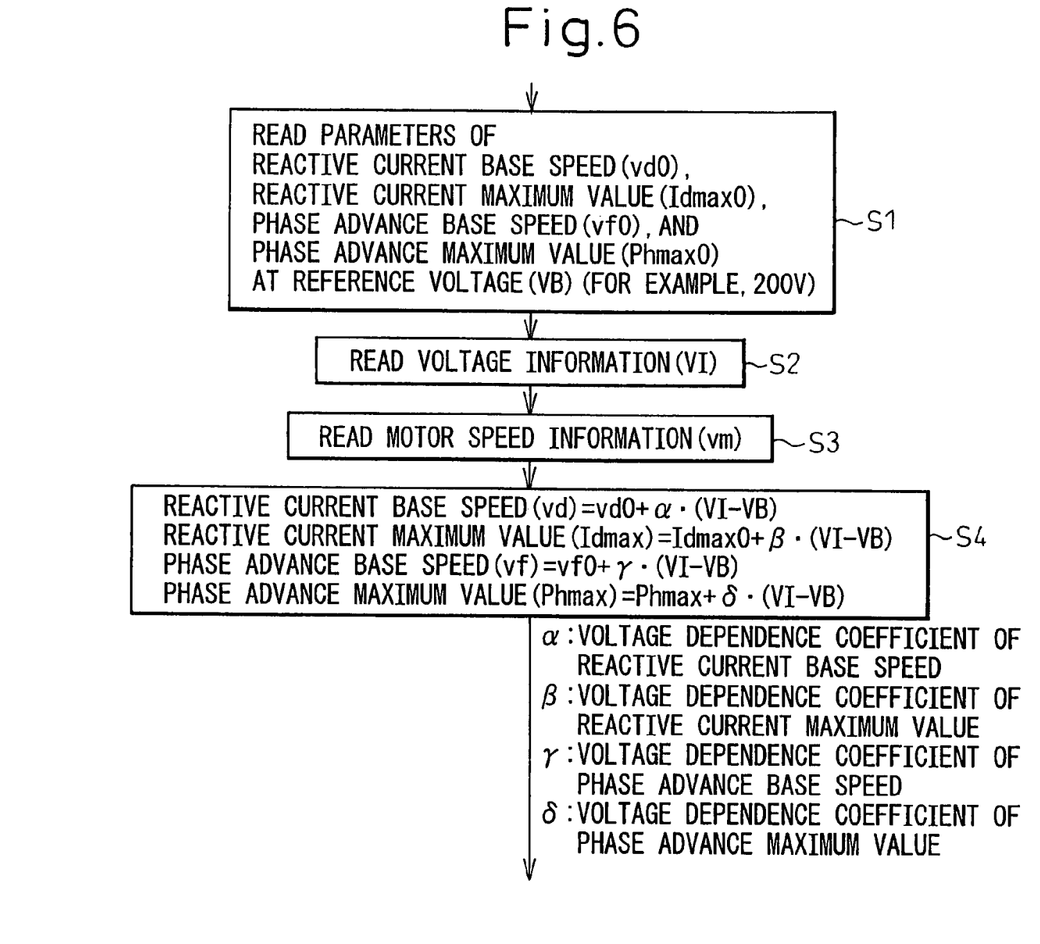
FIGS. 6 and 7 are flowcharts for explaining an example of the operation of a current control unit according to the present invention.
Figure 7:
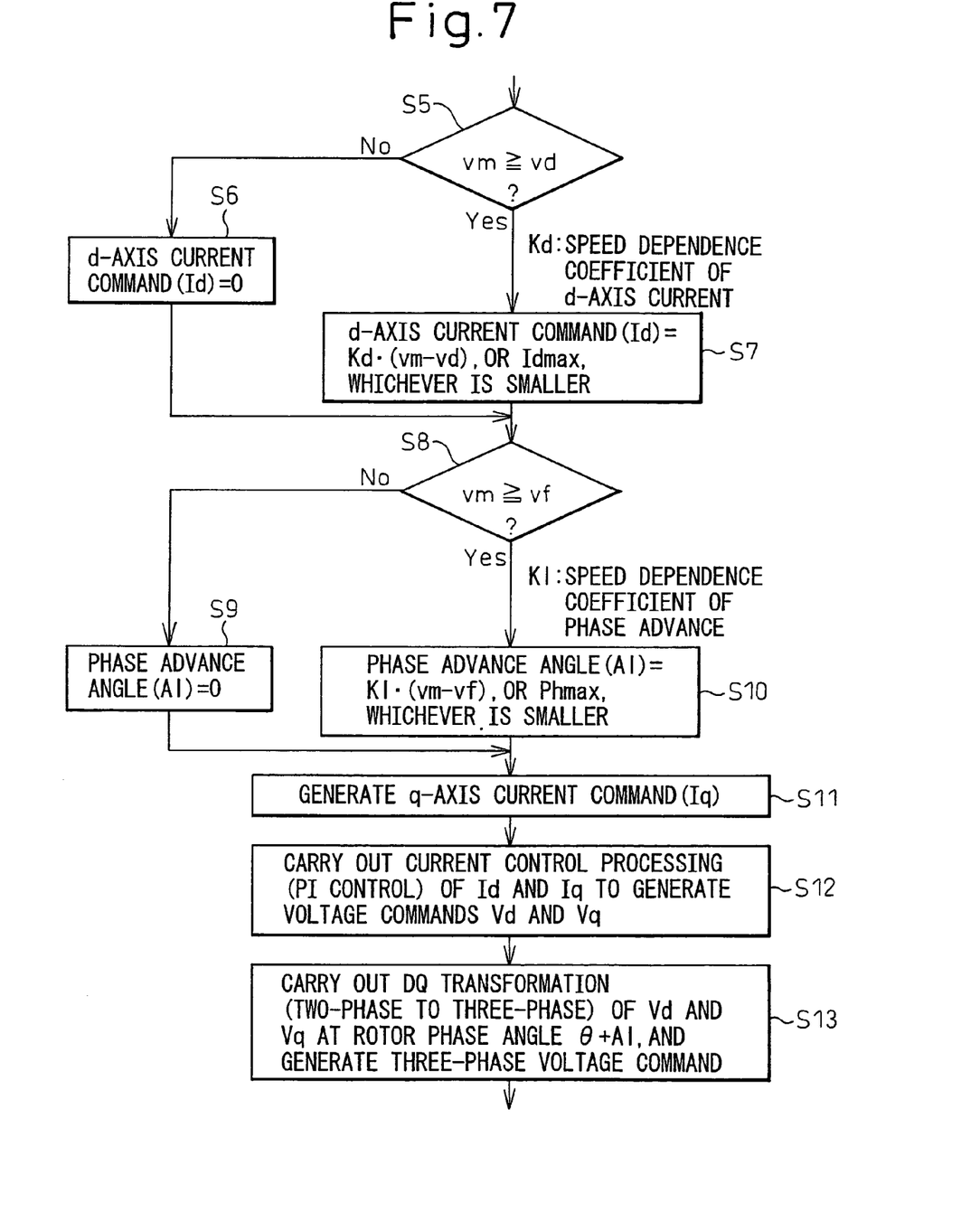

Next, an example of the operation of the current control unit that adjusts a reactive current which is passed to the synchronous motor based on a measured alternating current power supply voltage or a measured direct current link voltage is explained with reference to flowcharts shown in FIGS. 6 and 7. The following example shows the adjustment of a reactive current and the adjustment of a phase advance.

Parameters of initial values to be used for the current control are read first. These parameters are stored into a recording medium in advance according to a specification of a motor, and these parameters can be read into a motor control device when necessary.

The parameters include a reactive current base speed (vd0) that becomes a basis to determine a speed at which a reactive current is started to be passed, a reactive current maximum value (Idmax0) to determine a maximum reactive current, a phase advance base speed (vf0) at which a phase advance is started, and a phase advance maximum value (Phmax0). These parameters are set in advance according to a reference voltage (VB) (for example, 200V) (step S1).

The voltage measuring unit 2 reads voltage information (VI) that is supplied to the power amplifier 7 (step S2), and a motor speed detector (not shown) reads speed information of the motor (step S3).

At the next step, a reactive current base speed at which a reactive current is started to be passed and a reactive current maximum value are obtained regarding the reactive current, and a phase advance base speed and a phase advance maximum value are obtained regarding the phase advance.

First, a reactive current is explained with reference to a diagram showing a reactive current and a continuous torque characteristic in the reactive current control shown in FIG. 8.

In the reactive current adjusting unit 10 of the current control unit 1, the base speed changing unit 11 calculates a reactive current base speed (vd) at which a reactive current is started to be passed. The reactive current base speed (vd) is calculated based on the following expression.

$$(vd)=vd0+\alpha\cdot(VI-VB)$$

In the above expression, VI denotes a power supply voltage (measured information), VB denotes a reference voltage, vd0 denotes a reactive current base speed, and the coefficient α denotes a voltage dependence coefficient of the reactive current base speed. Based on the above, when the power supply voltage (VI) is a low voltage, the reactive current base speed at which the reactive current is started to be passed is set to a low speed (for example, A in FIG. 8). When the power supply voltage (VI) is a high voltage, the reactive current base speed at which the reactive current is started to be passed is set to a high speed (for example, B in FIG. 8).

In the reactive current adjusting unit 10, the reactive current maximum value changing unit 14 calculates a reactive current maximum value (Idmax) based on the following expression.

$$(Idmax)=Idmax0+\beta\cdot(VI-VB)$$

In the above expression, VI denotes a power supply voltage (measured information), VB denotes a reference voltage, Idmax0 denotes a reactive current maximum value, and the coefficient β denotes a voltage dependence coefficient of the reactive current maximum value.

Figure 8:
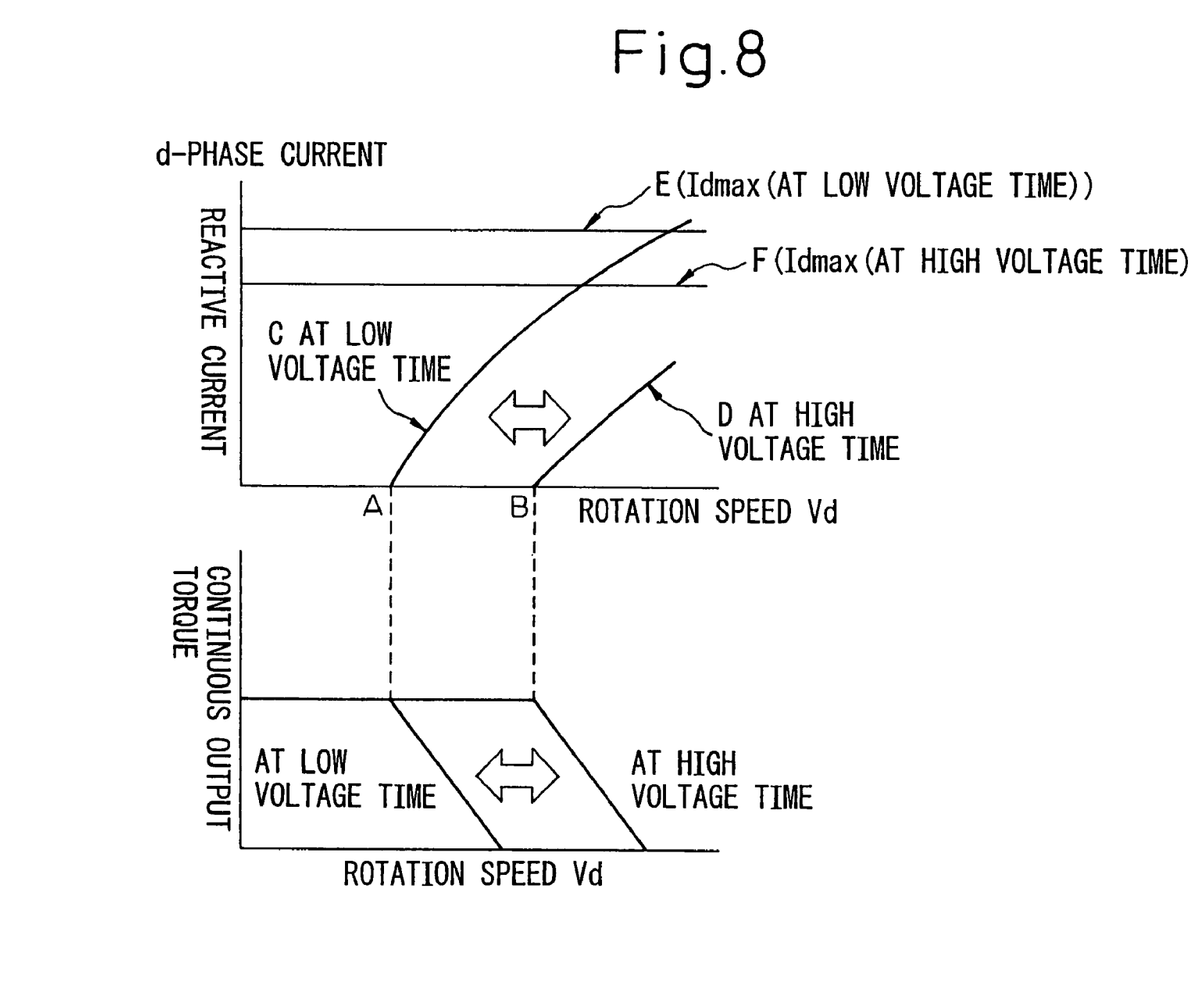
FIG. 8 is a diagram showing a reactive current and a continuous torque characteristic in reactive current control according to the present invention.

Based on the above, when the power supply voltage (VI) is a low voltage, the reactive current maximum value is set large (for example, E in FIG. 8). When the power supply voltage (VI) is a high voltage, the reactive current maximum value is set small (for example, F in FIG. 8).

Next, a phase advance is explained with reference to a diagram showing a phase advance and instantaneous torque characteristic in the phase advance control shown in FIG. 9.

In the phase advance adjusting unit 20 of the current control unit 1, the base speed changing unit 21 calculates a phase advance base speed (vf) at which a phase advance is started. The phase advance base speed (vf) is calculated based on the following expression.

$$(vf)=vf0+\gamma\cdot(VI-VB)$$

In the above expression, VI denotes a power supply voltage (measured information), VB denotes a reference voltage, vf0 denotes a phase advance base speed at which a phase advance is started, and the coefficient γ denotes a voltage dependence coefficient of the phase advance base speed.

Figure 9:
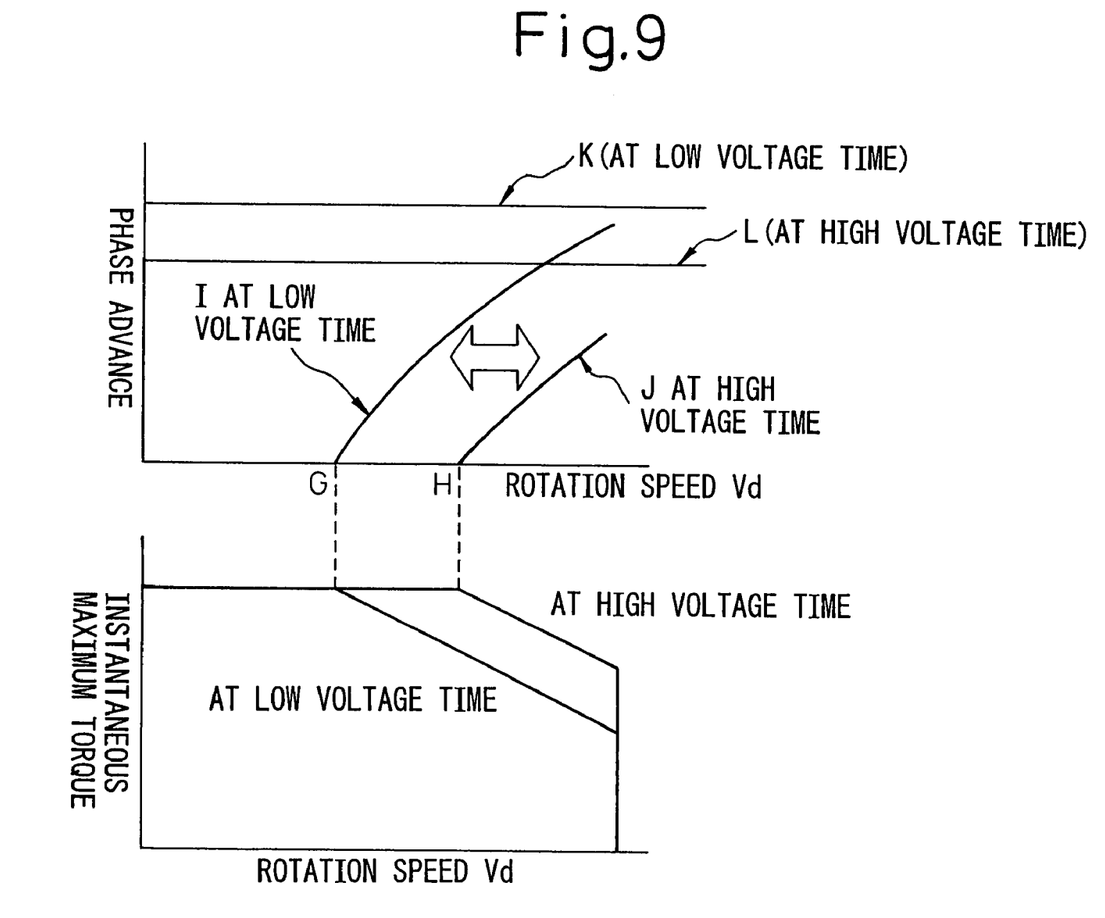
FIG. 9 is a diagram showing a phase advance and instantaneous torque characteristic in phase advance control according to the present invention.

Based on the above, when the power supply voltage (VI) is a low voltage, the phase advance base speed at which the phase advance is started is set to a low speed (for example, G in FIG. 9). When the power supply voltage (VI) is a high voltage, the phase advance base speed at which the phase advance is started is set to a high speed (for example, H in FIG. 9).

In the phase advance adjusting unit 20, the phase advance maximum value changing unit 24 calculates a phase advance maximum value (Phmax) based on the following expression.

$$(Phmax)=Phmax0+\delta\cdot(VI-VB)$$

In the above expression, VI denotes a power supply voltage (measured information), VB denotes a reference voltage, Phmax0 denotes a phase advance maximum value, and the coefficient δ denotes a voltage dependence coefficient of the phase advance maximum value.

Based on the above, when the power supply voltage (VI) is a low voltage, the phase advance maximum value is set large (for example, K in FIG. 9). When the power supply voltage (VI) is a high voltage, the phase advance maximum value is set small (for example, L in FIG. 9) (step S4).

Next, a reactive current command (a d-axis current command) is generated at step S5 to step S7.

Until when the rotation speed (vm) of the rotor exceeds the speed (vd) at which a reactive current is started to be passed (step S5), the reactive current command (the d-axis current command) is kept at "0" (step S6). When the rotation speed (vm) of the rotor exceeds the speed (vd) at which a reactive current is started to be passed (step S5), the reactive current command (the d-axis current command) is obtained.

Either the reactive current command (the d-axis current command) (Id) or the reactive current maximum value (Idmax), whichever is the smaller, obtained based on the following expression, is used for the reactive current command.

$$(Id) = Kd \cdot (vm - vd)$$

In the above expression, Kd denotes a speed dependence coefficient of a d-axis current, vm denotes a rotation speed of a rotor, and vd denotes a speed at which a reactive current is started to be passed.

The reactive current (Id) in the above expression shows a characteristic of a symbol C in FIG. 8 when the power supply voltage is a low voltage, and shows a characteristic of a symbol D in FIG. 8 when the power supply voltage is a high voltage.

On the other hand, the reactive current maximum value (Idmax) is expressed by the symbol E in FIG. 8 when the power supply voltage is a low voltage, and is expressed by the symbol F in FIG. 8 when the power supply voltage is a high voltage, as explained above.

Based on the above process, the reactive current command (the d-axis current command) increases or decreases according to a size of the power supply voltage as shown in FIG. 8. When the power supply voltage is high, an unnecessary reactive current can be suppressed, thereby increasing the continuous output torque in the high-speed area, as shown in the continuous output torque characteristic in FIG. 8 (step S7).

Next, a phase advance is generated at step S8 to step S10.

Until the rotation speed (vm) of the rotor exceeds the speed (vf) at which a phase advance is started (step S8), the phase advance (the phase advance angle) (AI) is kept at "0", and the phase is not advanced (step S9). When the rotation speed (vm) of the rotor exceeds the speed (vf) at which a phase advance is started (step S8), the phase advance (the phase advance angle) (AI) is obtained.

Either the phase advance (the phase advance angle) (AI) or the phase advance maximum value (Phmax), whichever is the smaller, obtained based on the following expression, is used for the phase advance (the phase advance angle).

$$(AI) = KI \cdot (vm - vf)$$

In the above expression, KI denotes a speed dependence coefficient of a phase advance, vm denotes a rotation speed of a rotor, and vf denotes a speed at which a phase advance is started.

The phase advance (AI) in the above expression shows a characteristic of a symbol I in FIG. 9 when the power supply voltage is a low voltage, and shows a characteristic of a symbol J in FIG. 9 when the power supply voltage is a high voltage.

On the other hand, the phase advance maximum value (Phmax) is expressed by the symbol K in FIG. 9 when the power supply voltage is a low voltage, and is expressed by the symbol L in FIG. 9 when the power supply voltage is a high voltage, as explained above.

Based on the above process, the phase advance increases or decreases according to a size of the power supply voltage as shown in FIG. 9. A maximum torque characteristic can be obtained at each voltage ranging from a low voltage to a high voltage (step S10).

After a q-axis current command (Iq) is generated (step S11), a d-phase current controller 4 controls a current (PI control) to generate a voltage command Vd, and a q-phase current controller 5 controls a current (PI control) to generate a voltage command Vq (step S12).

A two-phase to three-phase transformer 6 generates a three-phase voltage command by DQ transformation of the generated voltage commands Vd and Vq using a phase angle θ of the rotor and the phase advance (AI) obtained at steps S9 and S10, and transmits the obtained three-phase voltage command to the power amplifier 7 (step S13).

According to the present invention, there is an effect that a reactive current control and a current phase control can be carried out directly according to a change in the input power supply voltage.

As a result, a reactive current is not passed more than is necessary. Because heating decreases, a continuous output torque can be increased. Further, whether a power supply voltage is low or high, a maximum torque can be obtained according to this voltage.

What is claimed is:

1. A motor control device for controlling a synchronous motor having a permanent magnet comprising:
    a voltage measuring unit that measures a voltage supplied to a driving amplifier;
    a reactive current adjusting unit that adjusts a reactive current passed to the synchronous motor based on the measured voltage;
    wherein the voltage measuring unit measures an alternating current power supply voltage that is supplied to the driving amplifier, and the reactive current adjusting unit adjusts a reactive current that is passed to the synchronous motor based on the measured alternating current power supply voltage; and
    wherein
    the reactive current adjusting unit comprises:
    a base speed changing unit that changes a base speed at which a reactive current is started to be passed based on the measured voltage; and
    a speed difference calculating unit that calculates a speed difference between a motor actual speed and the base speed,
    wherein a reactive current command being generated on basis of the calculated speed difference.

2. The motor control device according to claim 1, wherein the reactive current adjusting unit generates a reactive current command by multiplying a speed dependence coefficient of a reactive current to the calculated speed difference.

3. The motor control device according to claim 1, further comprising
    a speed dependence coefficient adjusting unit that adjusts a speed dependence coefficient of a reactive current based on the measured voltage.

4. A motor control device for controlling a synchronous motor having a permanent magnet comprising:
    a voltage measuring unit that measures a voltage supplied to a driving amplifier;
    a reactive current adjusting unit that adjusts a reactive current passed to the synchronous motor based on the measured voltage;

wherein the voltage measuring unit measures an alternating current power supply voltage that is supplied to the driving amplifier, and the reactive current adjusting unit adjusts a reactive current that is passed to the synchronous motor based on the measured alternating current power supply voltage;

the reactive current adjusting unit comprises a reactive current maximum value changing unit that changes a maximum value of a reactive current based on the measured voltage, wherein a maximum value of a reactive current command being limited on basis of the changed maximum value of the reactive current; and wherein the reactive current maximum value changing unit generates a reactive current command as a changed value by multiplying a voltage dependence coefficient to a voltage difference between the measured voltage and a reference voltage.

5. A motor control device for controlling a synchronous motor having a permanent magnet comprising:

a voltage measuring unit that measures a voltage supplied to a driving amplifier;

a reactive current adjusting unit that adjusts a reactive current passed to the synchronous motor based on the measured voltage;

wherein the voltage measuring unit measures a direct current voltage supplied to the driving amplifier, or a direct current voltage converted from an alternating current power supply input within the driving amplifier, wherein the reactive current adjusting unit adjusts a reactive current that is passed to the synchronous motor based on the measured direct current voltage;

wherein the reactive current adjusting unit comprises:

a base speed changing unit that changes a base speed at which a reactive current is started to be passed based on the measured voltage; and a speed difference calculating unit that calculates a speed difference between a motor actual speed and the base speed, wherein a reactive current command being generated on basis of the calculated speed difference.

6. The motor control device according to claim 5, wherein the reactive current adjusting unit generates a reactive current command by multiplying a speed dependence coefficient of a reactive current to the calculated speed difference.

7. The motor control device according to claim 5, further comprising a speed dependence coefficient adjusting unit that adjusts a speed dependence coefficient of a reactive current based on the measured voltage.

8. A motor control device for controlling a synchronous motor having a permanent magnet comprising:

a voltage measuring unit that measures a voltage supplied to a driving amplifier;

a reactive current adjusting unit that adjusts a reactive current passed to the synchronous motor based on the measured voltage;

wherein the voltage measuring unit measures a direct current voltage supplied to the driving amplifier, or a direct current voltage converted from an alternating current power supply input within the driving amplifier, wherein the reactive current adjusting unit adjusts a reactive current that is passed to the synchronous motor based on the measured direct current voltage; and wherein the reactive current adjusting unit comprises a reactive current maximum value changing unit that changes a maximum value of a reactive current based on the measured voltage, wherein a maximum value of a reactive current command being limited on basis of the changed maximum value of the reactive current.

9. The motor control device according to claim 8, wherein the reactive current maximum value changing unit generates a reactive current command as a changed value by multiplying a voltage dependence coefficient to a voltage difference between the measured voltage and a reference voltage.

10. A motor control device for controlling a synchronous motor having a permanent magnet comprising:

a voltage measuring unit that measures a voltage supplied to a driving amplifier;

a phase advance adjusting unit that adjusts a phase advance from a reference phase of a current that is passed to the synchronous motor based on the measured voltage;

wherein the voltage measuring unit measures an alternating current power supply voltage that is supplied to the driving amplifier, and wherein the phase advance adjusting unit adjusts the phase advance from a reference phase of a current that is passed to the synchronous motor based on the measured alternating current power supply voltage;

wherein the phase advance adjusting unit comprises:

a base speed changing unit that changes a base speed at which a phase advance is started based on the measured voltage; and a speed difference calculating unit that calculates a speed difference between a motor actual speed and the base speed, wherein a phase advance being generated on basis of the calculated speed difference.

11. The motor control device according to claim 10, wherein the phase advance adjusting unit generates a phase advance by multiplying a speed dependence coefficient of a phase advance to the calculated speed difference.

12. The motor control device according to claim 11, further comprising a speed dependence coefficient adjusting unit that adjusts a speed dependence coefficient of a phase advance based on the measured voltage.

13. A motor control device for controlling a synchronous motor having a permanent magnet comprising:

a voltage measuring unit that measures a voltage supplied to a driving amplifier; and a phase advance adjusting unit that adjusts a phase advance from a reference phase of a current that is passed to the synchronous motor based on the measured voltage;

the voltage measuring unit measures an alternating current power supply voltage that is supplied to the driving amplifier, and the phase advance adjusting unit adjusts the phase advance from a reference phase of a current that is passed to the synchronous motor based on the measured alternating current power supply voltage;

the phase advance adjusting unit comprises a phase advance maximum value changing unit that changes a maximum value of a phase advance based on the measured voltage, wherein a maximum value of a phase advance being limited on basis of the changed maximum value of the phase advance.

14. The motor control device according to claim 13, wherein the phase advance maximum value changing unit generates a phase advance maximum value as a changed value by multiplying a voltage dependence coefficient of a phase advance maximum value to a voltage difference between the measured voltage and a reference voltage.

15. A motor control device for controlling a synchronous motor having a permanent magnet comprising:

a voltage measuring unit that measures a voltage supplied to a driving amplifier;

a phase advance adjusting unit that adjusts a phase advance from a reference phase of a current that is passed to the synchronous motor based on the measured voltage wherein the voltage measuring unit measures a direct current voltage supplied to the driving amplifier, or a direct current voltage converted from an alternating current power supply input within the driving amplifier, and the phase advance adjusting unit adjusts a phase advance from a reference phase of a current that is passed to the synchronous motor based on the measured direct current voltage, wherein the phase advance adjusting unit comprises:

a base speed changing unit that changes a base speed at which a phase advance is started based on the measured voltage; and a speed difference calculating unit that calculates a speed difference between a motor actual speed and the base speed, wherein a phase advance being generated on basis of the calculated speed difference.

16. The motor control device according to claim 15, wherein the phase advance adjusting unit generates a phase advance by multiplying a speed dependence coefficient of a phase advance to the calculated speed difference.

17. The motor control device according to claim 16, further comprising a speed dependence coefficient adjusting unit that adjusts a speed dependence coefficient of a phase advance based on the measured voltage.

18. A motor control device for controlling a synchronous motor having a permanent magnet comprising:

a voltage measuring unit that measures a voltage supplied to a driving amplifier;

a phase advance adjusting unit that adjusts a phase advance from a reference phase of a current that is passed to the synchronous motor based on the measured voltage wherein the voltage measuring unit measures a direct current voltage supplied to the driving amplifier, or a direct current voltage converted from an alternating current power supply input within the driving amplifier, and the phase advance adjusting unit adjusts a phase advance from a reference phase of a current that is passed to the synchronous motor based on the measured direct current voltage, wherein the phase advance adjusting unit comprises a phase advance maximum value changing unit that changes a maximum value of a phase advance based on the measured voltage, wherein a maximum value of a phase advance being limited on basis of the changed maximum value of the phase advance.

19. The motor control device according to claim 18, wherein the phase advance maximum value changing unit generates a phase advance maximum value as a changed value by multiplying a voltage dependence coefficient of a phase advance maximum value to a voltage difference between the measured voltage and a reference voltage.

* * * * *